April 12, 1955 L. GESS 2,706,084

MEASURING, INDICATING, AND RECORDING INSTRUMENT

Original Filed Sept. 11, 1948

8 Sheets-Sheet 1

INVENTOR.
LOUIS GESS

BY Arthur H. Swenson

ATTORNEY.

April 12, 1955

L. GESS 2,706,084

MEASURING, INDICATING, AND RECORDING INSTRUMENT

Original Filed Sept. 11, 1948

8 Sheets-Sheet 2

*INVENTOR.*
LOUIS GESS

*BY* Arthur H. Swenson

ATTORNEY

INVENTOR.
LOUIS GESS
BY Arthur H. Swanson
ATTORNEY

April 12, 1955 L. GESS 2,706,084

MEASURING, INDICATING, AND RECORDING INSTRUMENT

Original Filed Sept. 11, 1948

8 Sheets-Sheet 4

INVENTOR.
LOUIS GESS
BY Arthur H. Swenson
ATTORNEY

INVENTOR.
LOUIS GESS
BY Arthur H. Swanson
ATTORNEY.

INVENTOR.
LOUIS GESS
BY Arthur H. Swenson
ATTORNEY

MEASURING, INDICATING, AND RECORDING INSTRUMENT

INVENTOR.
LOUIS GESS

BY Arthur H. Swenson

ATTORNEY.

MEASURING, INDICATING, AND RECORDING INSTRUMENT

Original Filed Sept. 11, 1948 8 Sheets-Sheet 8

INVENTOR.
LOUIS GESS

BY Arthur H. Swenson
ATTORNEY.

United States Patent Office 2,706,084
Patented Apr. 12, 1955

2,706,084

MEASURING, INDICATING, AND RECORDING INSTRUMENT

Louis Gess, Jenkintown, Pa., assignor to Minneapolis-Honeywell Regulator Company, Minneapolis, Minn., a corporation of Delaware Original application September 11, 1948, Serial No. 48,856, now Patent No. 2,666,585, dated January 19, 1954. Divided and this application June 1, 1953, Serial No. 358,697

6 Claims. (Cl. 236—51)

This application is a division of co-pending application Serial Number 48,856 in the name of Louis Gess, filed September 11, 1948, now U. S. Patent 2,666,585, patented January 19, 1954.

In many modern industrial processes it is undesirable and in some cases impossible for the operator or person having charge of the process to be close to it. This is for the reason that such processes are so hot, dirty, noisy or dangerous that it is inadvisable for a human being to be at their immediate vicinity.

It is a theoretical ideal that processes be made completely automatic. Obviously this theoretical ideal cannot be realized completely in actual practice because in the beginning the process must be started up and must, eventually, be shut down. Therefore it is necessary that means be provided to control such processes from a remote point, hereinafter referred to as the control location. In order to exercise the control of such a process, there must be (1) a final control element, such as a valve, controlling one process variable; (2) a measuring element responsive to the variable under control; and (3) a controller, whereby the measuring element actuates the final control element. Such a controller usually involves a separate source of power and a relay whereby the measuring element, which is sensitive and therefore has little driving power, actuates the final control element, which may be very large and therefore require considerable power to drive it.

Moreover, the apparatus in which industrial processes of the character referred to are carried out is often enormous in size, constituting complete industrial plants, in which the several process variables interact or are correlated so that the variations of one affect one or more other variables.

It is known to assemble means for controlling the separate final control elements at one control location in a centralized control room which may be equipped with instruments for indicating and recording the control of many variable functions such as temperature, pressure, flow or liquid level. A panel board on which the various control means are arranged is located at the control room.

It is an object of this invention to provide at such a control location an indicator or recorder to inform the operator that the control operations which he has initiated from the control location have been transmitted to the various final control elements located throughout the plant and that the consequent operations of these final control elements have actually affected the process under control in the desired manner.

A further object of this invention is to provide air-operated means for controlling the final control elements and for reporting back the operations of the final control elements to the control location. The advantages of air-operation for these purposes are well known. Foremost among these advantages is the removal of the explosion hazards where explosive gases or fluids are present. Additional advantages are the inherent stability, accuracy and flexibility of air operation.

Yet another object of this invention is to provide a control system having manually operable elements at a control location from which a controller located adjacent the final control apparatus can be controlled by hand so that the operations of the controller vary the final control element as quickly as possible with a minimum of lag or delay.

A still further object of this invention is to provide a control system having an indicator or recorder at the control location and under the control of the controller so as to indicate the movements of the controller and having a measuring instrument located adjacent the process variable under control and arranged to be sensitive to changes in this process variable.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

FIGS. 1 AND 2

Figures 1, 2:
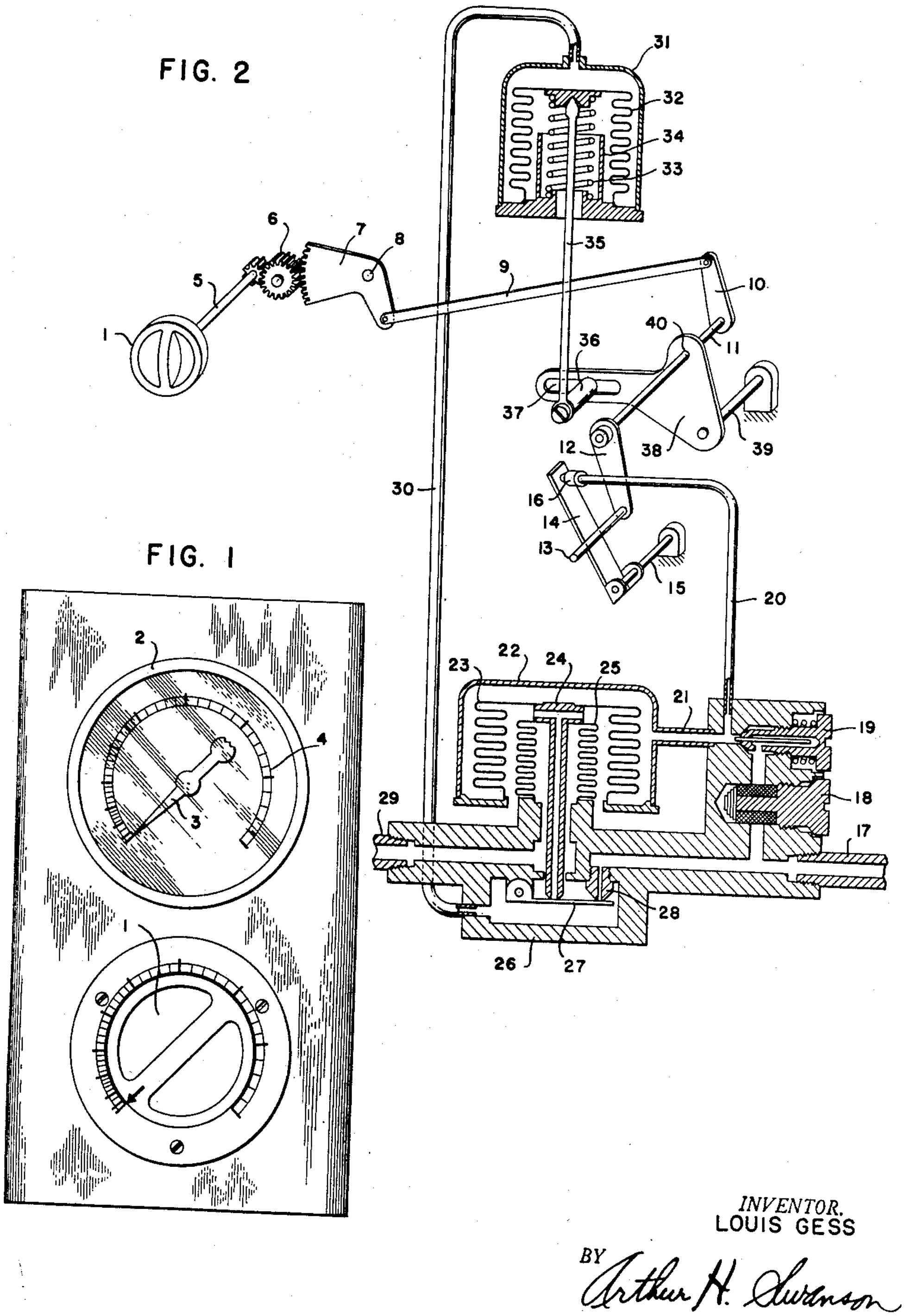
Fig. 1 is a front elevetion of the transmitter and the adjacent indicator.
Fig. 2 is a diagrammatic or schematic view in projection showing the transmitter with parts in cross section.

Fig. 1 shows the front or face of the transmitter which is located at any convenient control station, such as the panel board. A handle or an operating knob 1 is rotatably mounted in the panel board beneath an indicator 2 having a pointer 3 moving over a dial 4. Knob 1 bears an arrow-shaped marking on it cooperating with a stationary curved scale which may be logarithmic (as shown) or of any desired spacing to indicate the position to which the knob 1 is set. Fig. 2 shows that handle 1 turns a shaft 5 connected to gearing 6 which, in turn, rotates a bell crank lever 7 about its pivot 8 and thus moves a link 9. Attached at the far end of link 9 is a lever 10 fast on a shaft 11 to which is also secured a second lever 12 bearing a flapper-operating pin 13. Pin 13 is movable into and out of engagement with a flapper 14 which is pivotally movable about a stationary pivot 15. Flapper 14 is stressed by a spring towards engagement with a nozzle 16. Nozzle 16 forms the control of a pilot valve of a well known commercial type which includes an air inlet pipe 17 which admits air to a forked channel. One fork or branch of the channel leads through a filter 18 and an adjustable restriction 19 to a pipe 20 ending at nozzle 16 and to a branch pipe 21 leading to casing 22 which contains outer bellows 23. Secured to bellows 23 is one end of a hollow exhaust pipe 24 which is also secured to the inner bellows 25 which seals the exhaust pipe to the pilot valve or relay casing 26. The lower end of exhaust pipe 24 is scaled by a second flapper 27 when the exhaust pipe 24 engages the flapper 27. Flapper 27 also controls the main flow of air through the nozzle 28. Exhaust pipe 29 leads to the receiver or other device controlled by the pilot valve or relay. Feedback pipe 30 leads from the off-take side of the flapper-chamber and communicates with bellows casing 31 containing a bellows 32 stressed by a spring 33 and having its motion limited in one direction by a cylindrical stop 34. Motion of bellows 32 is transmitted to a differential, one input of which is provided by the manually caused movement of knob 1 and the other input of which is formed of the resetting movement of bellows 32. Bellows 32 moves a link 35 at the end of which is formed a pin 36 slidable in a slot 37. A bell crank lever 38 is pivotally mounted on a stationary pivot 39 and contains in it an opening 40 through which the shaft 11 passes.

FIGS. 3 AND 4

Figure 3:
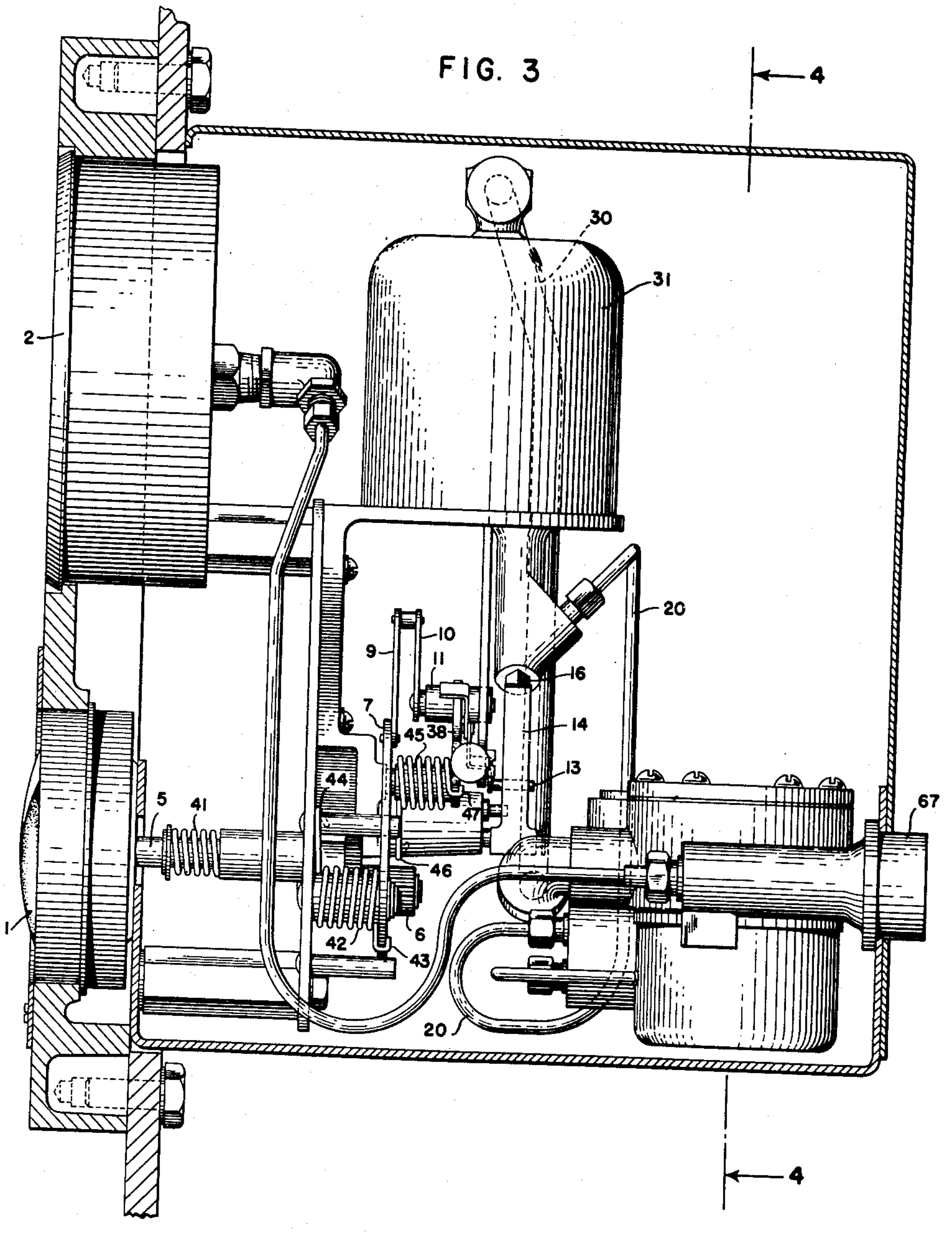
Fig. 3 is a side elevation of the transmitter and its associated indicator with parts in vertical cross section.
Figure 4:
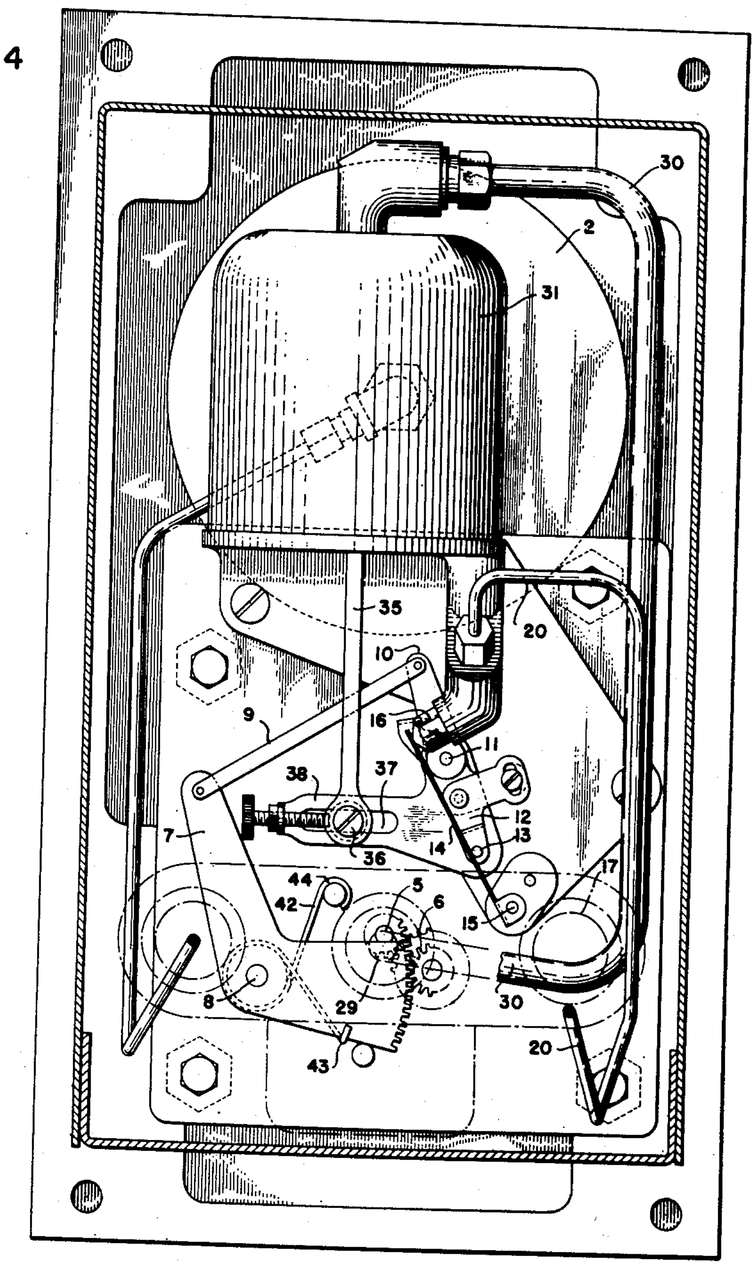
Fig. 4 is a rear elevation of the transmitter and indicator with the rear cover removed as viewed from the line 4—4 of Fig. 3.

Figs. 3 and 4 show this manually operated transmitter in greater detail. The knob or handle 1 is rotatably mounted in the panel so that its front face is substantially flush with the front face of the panel. The shaft 5 is stressed by a spring 41 which tends to take up any back lash which there may be in the gearing 6. The bell crank lever 7 is biased for counter-clockwise rotation by a spring 42 one end 43 of which engages the bell crank lever 7 and which is fastened to the instrument casing at its opposite end 44. Bell crank lever 7, by means of link 9 and lever 10, turns shaft 11 and pin 13 carried thereby. Spring 45 has one end 46 fast to the instrument casing and stresses at its other end 47 against the bell crank lever 38, tending to hold the bell crank lever 38 against the pin 36 which is located in the slot 37 forming a part of the lever 38. The air inlet 17 communicates with the pipe 20 which leads to the nozzle 16 while the air outlet pipe 29 communicates with the pipe 30 which leads to the casing 31 which contains the reset bellows.

*Operation of Figs. 3 and 4*

The operation of the manually operated pneumatic transmitter will be readily understood by referring to Fig. 2. When the manually operated transmitter is turned, it operates the receiver which is connected to the air outlet pipe 29 so as to adjust the set point or control point of a controller located at a remote place. Turning knob 1 in one direction or the other operates the flapper pin 13 through the mechanical linkage formed by shaft 5, gearing 6, bell crank lever 7, link 9, lever 10, shaft 11, and lever 12. Movement of pin 13 in engagement with flapper 14 turns the flapper 14 under the stress of its actuating spring about the flapper pivot 15. The movement of flapper 14 relative to nozzle 16 varies the air pressure applied to bellows 23 and causes consequent movement of exhaust pipe 24 so that either air is exhausted from the pilot valve or the flapper 27 is moved away from nozzle 28 to admit additional air to the pilot valve chamber. When sufficient air is exhausted from or admitted to the pilot valve, the bellows 25 contracts or expands and the flapper 27 closes off the exhaust pipe 24 and the inlet nozzle 28. The air controlled by the pilot valve flows through the outlet pipe 29 to the receiver connected to the opposite end of pipe 29. The controlled air within the pilot valve is also fed through pipe 30 to the bellows casing 31 wherein it causes consequent movement of bellows 32. The movement of bellows 32 (due to any difference existing between the air pressure in the bellows casing 31 and the stress of spring 33) is transmitted by the link or bellows rod 35 to the lever 38. Rotation of lever 38 in one direction or the other rotates flapper pin 13 in the opposite direction to which it has been set by knob 1 and thus resets the flapper 14 so as to control the air pressure within the bellows casing 22 at the new value desired.

FIG. 5

Figure 5:
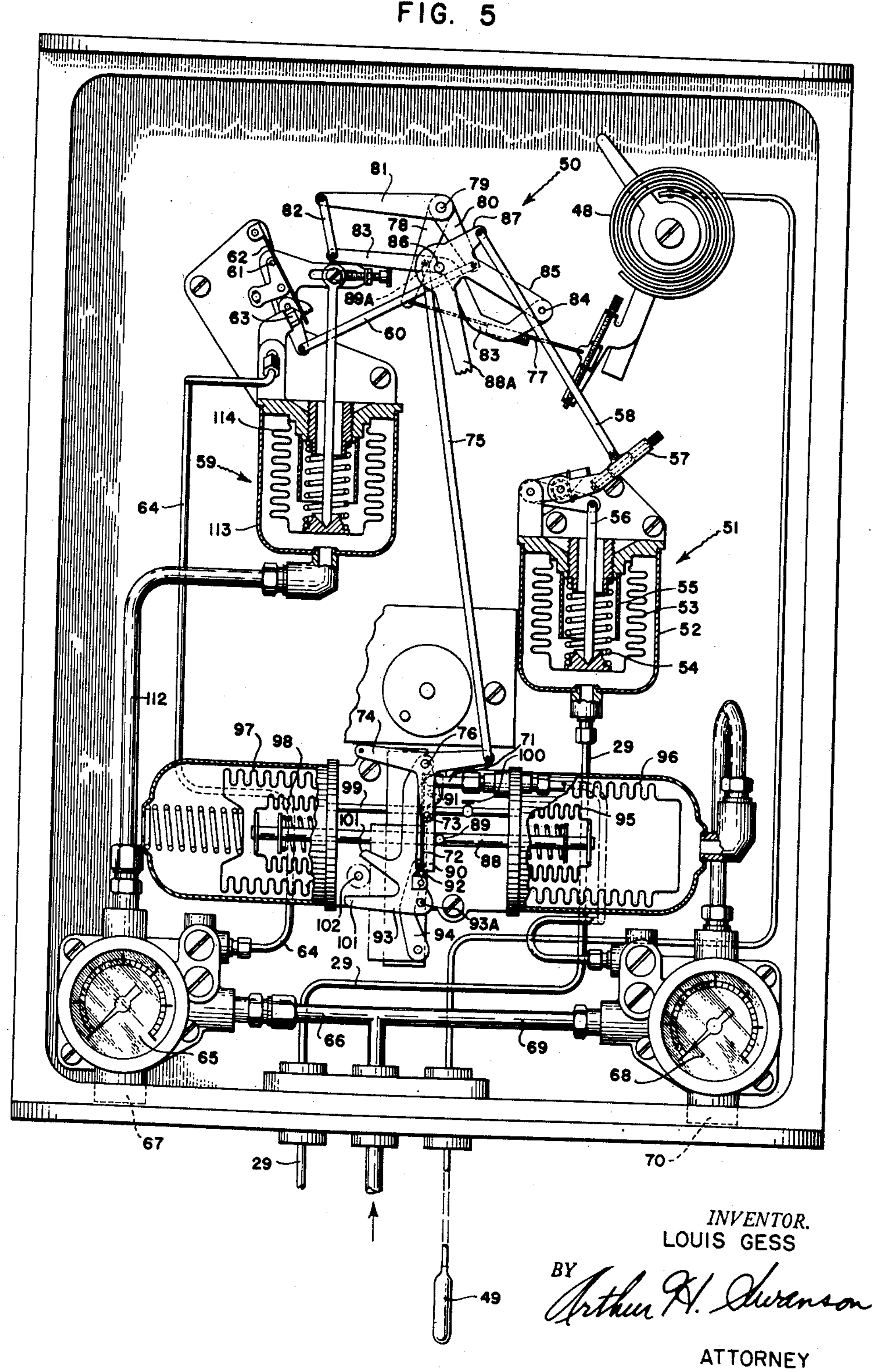
Fig. 5 is a front elevation of the controller with the front cover removed showing parts in vertical cross section.

Fig. 5 shows the details of a controller which is located adjacent the valve or other final control element. This controller may be of the type shown in U. S. Patent 2,125,081, granted July 26, 1938. This controller contains a measuring element, which is shown as being a thermometer formed by a spiral or Bourdon tubing 48 actuated by liquid or vapor pressure from a suitable bulb 49 located at the point, whose temperature it is desired to measure. However, instead of a measuring element for temperature, a measuring element for pressure, flow, or liquid level may be employed. The movement of the measuring element 48 forms one input of a differential, generally indicated at 50. The other input of differential 50 is provided by an air-operated receiver, generally indicated at 51, and connected to the manually operated transmitter by a pipe 29. Receiver 51 is formed by a bellows casing 52 containing a bellows 53 which is matched to or interchangeable with the bellows 32 of the manually operated transmitter. Bellows 53 is stressed by a spring 54 and has its movement in the direction in which it is operated by the air within the bellows casing 51 limited by a cylindrical stop 55. Bellows 53 engages one end of a bellows rod or link 56 whose opposite end has pivotal engagement with a lever system, generally indicated at 57. The output of lever system 57 is transmitted by link 58 which forms one input of the differential, generally indicated at 50.

The position of measuring element 48 is also fed to a second transmitter, generally indicated at 59, by means of a link 60 which controls the setting of the pin 61 operating the flapper 62 with relation to the nozzle 63. The transmitter 59 has the same elements as the manually operated transmitter except that the link 60, which is the equivalent of the manually operated link 9 of the manually operated transmitter, is operated by measuring instrument 48 instead of manually. The nozzle 63 is connected by a pipe 64 to a pilot valve, generally indicated at 65, and having an air inlet pipe 66 and an air outlet pipe 67. This air outlet pipe 67 is connected to and actuates the indicator 2 at the control station to indicate at the control station the value of the variable being measured at that instant by the measuring element of the controller at the remote location. Control of the final control element, such as a valve operated by an air-driven diaphragm motor or the like, is exercised by a pilot valve or relay, generally indicated at 68, having an air inlet pipe 69 and an air off-take 70 to the valve or other final control element. This controller is a well known commercial type and has an adjustable throttling range and an automatic reset. The pilot valve 68 is controlled by means of a nozzle 71 which is responsive to the flapper 72 controlled in turn by a flapper-actuating pin 73 mounted on a three-armed lever 74 pivoted at 76, which is actuated from the differential 50 by means of a control link 75.

Movements of the measuring element 48 are transmitted by a spring arm 77 to the arm 78 of a three-armed lever mounted on a stationary pivot 79. Arm 80 of this three-armed lever is connected to one end of link 60. The third arm 81 of this lever has pivotally connected to its free end a differential link 82 which is pivotally secured at its opposite end to one end of a floating lever 83. The opposite end 84 of lever 83 is carried by one arm 85 of a second three-armed lever pivotally mounted on a stationary pivot 86. A second arm 87 of the three-armed lever pivoted at 86 has a pivotal connection with the free end of link 58, while the third arm 88A of the lever pivoted at 86 forms an indicator or pointer denoting the location of the set point of a controller. The control link 75 has pivotal engagement with the floating lever 83 at point 89A, intermediate the ends of the floating lever 83. Thus the output of the differential 50 is connected by means of control link 75 with one arm of the three-armed lever 74 that is pivoted at 76. This lever has a pin 73 on it which serves to move flapper 72 against a suitable biasing force away from or to permit the flapper to move toward nozzle 71 to throttle the flow of air through this nozzle. The nozzle 71, along with a chamber formed in the pilot valve 68, is supplied with air from pipe 69. A restriction is formed in the supply pipe to the nozzle 71 and the chamber so that air is supplied thereto at a slower rate.

As the pressure in the chamber is varied, a follow-up movement is given to the flapper 72 by means of the action of a rod 88 and a projection 89 thereon upon a first lever 90 that is pivoted at 91, a pin 92 and a second lever 93 that is pivoted at 93*a*, which second lever supports the three-armed lever 74 by means of pivot 76. This pin 92 is attached to a supporting arm 94 and may be moved upwardly and downwardly between levers 90 and 93 to change the throttling range of the instrument. As the lever 93 is moved, the flapper is shifted in a direction opposite to its original movement in order to bring the instrument back to equilibrium. This second or follow-up movement is followed by a third compensating or reset movement. As pressure of the liquid in the chambers between bellows 95 and 96 and bellows 97 and 98 is equalized through the connection 99, the speed at which this reset motion can take place is dependent upon the adjustment of the restriction 100.

The total amount of follow-up movement that can be obtained, may be limited by the amount of movement that can be imparted to the lever 93. To this end the lever 93 is formed with a pair of fingers 101 which extend on either side of a shaft 102.

*Operation of Fig. 5*

In the operation of the instrument, if, for example, the temperature being measured has been increased, the pen 88A will be moved in a counter-clockwise direction outwardly across its chart. This same movement will cause the left-hand end of differential lever 83 to be lowered so that control link 75 will move lever 74 in a clockwise direction. Such a movement will move the pin 73 to the left so that the flapper 72 will be moved away from the nozzle 71, permitting more air to escape from this nozzle with a consequent decrease in pressure in the chamber of the pilot valve 68. The escape of air from the chamber of the pilot valve 68 will also cause a reduction of pressure in the chamber surrounding the bellows 96 thereby permitting the rod 88 with its projection 89 to move to the right. The levers 90 and 93 and the pin 92 will therefore cause a movement of the pivot point 76 and lever 74 to the right so that flapper 72 will be given a follow-up movement toward the nozzle 71. If the temperature being measured deviates a considerable amount from the control point of the instrument, the lever 93 will be forced to move in a clockwise direction until the lower one of the members 101 engages with rod 102 to stop further movement of this lever. Thereafter, the control instrument operation in that direction will be as an on-off instrument, since no further follow-up can be obtained.

In like manner, a decrease in the temperature being measured will cause a reverse operation to that above described so that an increase in pressure is obtained throughout the system with the lever 93 moving in a counter-clockwise direction to an extent limited by engagement between the upper member 101 and the shaft 102. It will therefore be seen that an air pressure corresponding to the temperature being measured will be set up in the chamber of the pilot valve 68 and this pressure will be varied with the changes in temperature within reasonable limits on either side of the control point. When the temperature changes beyond these limits, however, further follow-up movement cannot be obtained due to engagement of one of the members 101 with the shaft 102. Thereafter, the pressure in the chamber in the pilot relay 68 will go immediately to one of its limits. The amount of deviation from the control point, which is permitted the temperature prior to the time that the members 101 engage the shaft 102 can be varied.

FIG. 6

Figures 6, 7:
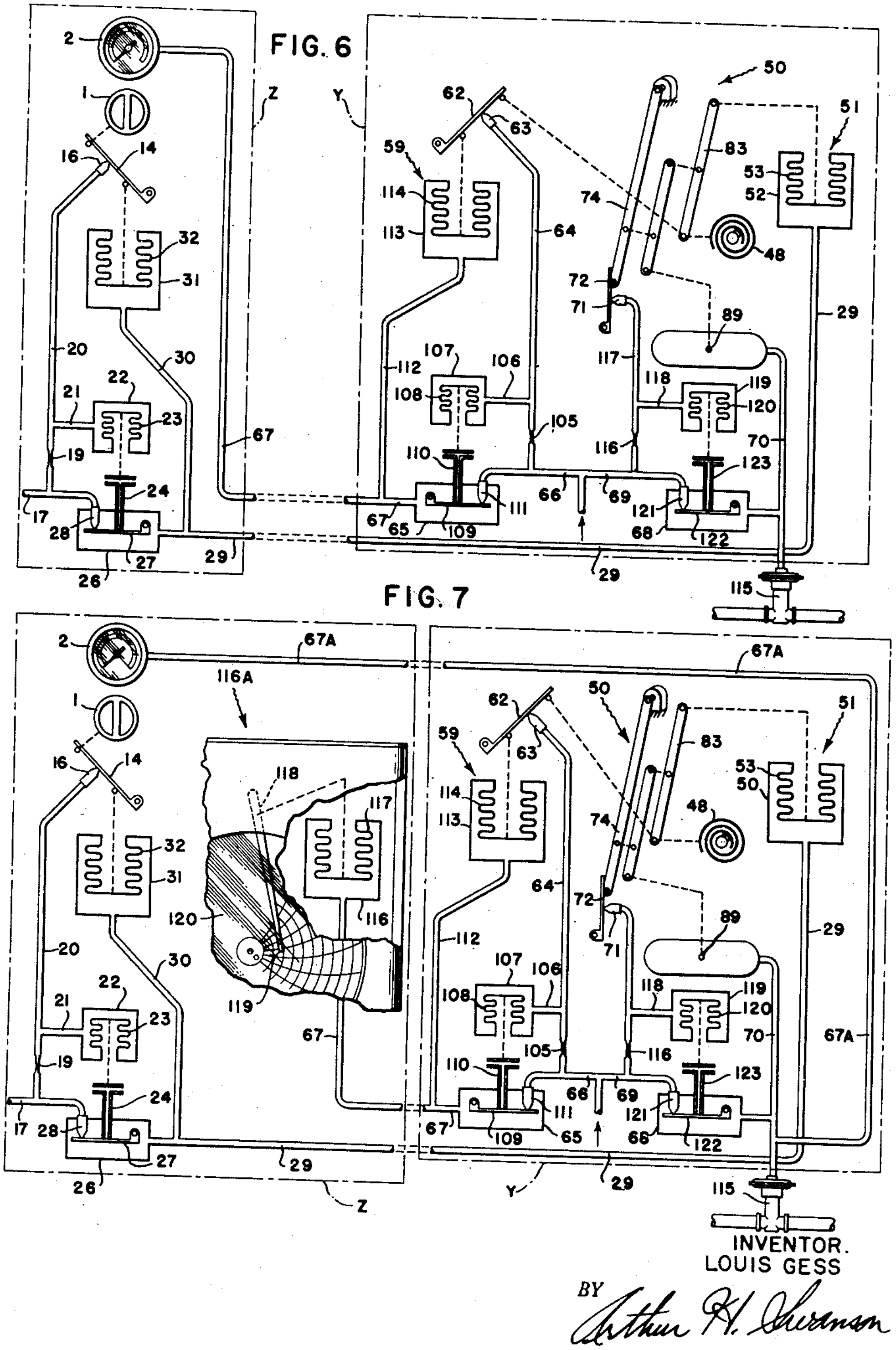
Fig. 6 is a diagrammatic or schematic showing of a complete pneumatic transmitting, controlling and indicating system according to this invention.
Figs. 7 through 9 are diagrammatic or schematic showings of modifications.

Fig. 6 shows in a diagrammatic or schematic form, a complete transmission system. The transmitter and its associated indicator (shown in detail in Figs. 3 and 4) are located at the left within the dotted and dashed lines Z, while the controller (shown in detail in Fig. 5) is indicated at the right within the dotted and dashed lines Y. Fig. 6 shows that the knob 1 controls the operation of flapper 14 cooperating with nozzle 16. Inlet air from pipe 17 branches and passes through restriction 19 and pipe 20 to nozzle 16 and also passes to the inlet nozzle 28 of the pilot valve or relay 26. Flapper 27 controls the admission of air through inlet nozzle 28 and the escape of air through exhaust pipe 24. Exhaust pipe 24 is operated by bellows 23 within casing 22 in response to the air pressure maintained at nozzle 16 and transmitted through pipes 20 and 21.

Outlet pipe 29 conducts air from the pilot valve or relay 26 to the receiver, generally indicated at 51, and having bellows 53 within casing 52. The controlled air from pilot valve 26 is fed back through pipe 30 to bellows casing 31 where it actuates bellows 32 to reposition flapper 14 by means of the differential shown in detail in Fig. 2.

Referring now to the controller within the dotted lines Y, it will be seen that the measuring element 48 feeds into one end of the differential, generally indicated at 50. The opposite end of the differential is fed from the receiver 51 by the linkage shown in detail on the right-hand of Fig. 5. The motions of measuring element 48 are fed directly to flapper 62 which cooperates with nozzle 63 forming part of the transmitter, generally indicated at 59. This transmitter comprises a pilot valve 65 to which air is fed from the pipe 66. This inlet air passes through restriction 105 to pipe 64 which terminates in nozzle 63. Pipe 64 also contains a branch 106 communicating with a bellows casing 107 in which are housed bellows 108. Pilot valve 65 has a flapper 109 controlling an exhaust pipe 110 actuated by bellows 108 and inlet nozzle 111 forming the end of inlet pipe 66. Off-take pipe 67 leads back to the indicator 2 located at the control station adjacent the handle 1. Pipe 67 also communicates with pipe 112 which leads back to bellows casing 113 containing bellows 114 which feed into a differential so as to give repositioning movement to flapper 62. The movements of measuring instrument 48 and of the receiver 51, which moves the control point or set point of the controller, control the actuation of the final control element, such as valve 115, by means of a pilot relay 68 to which air is led through an inlet pipe 69 and from which air escapes through a pipe 70. Pipe 70 also communicates with the throttling and reset mechanism explained in detail in connection with Fig. 5. This mechanism serves to reset flapper 72 by means of pin 89. Inlet air from pipe 69 passes through restriction 116 and through pipe 117 to nozzle 71. Pipe 117 contains a branch 118 communicating with a bellows casing 119 containing bellows 120. The full flow of air from pipe 69 passes through inlet nozzle 121, controlled by a flapper 122, which also controls the exhaust pipe 123 which is moved by bellows 120.

*Operation of Fig. 6*

When it is desired to adjust the setting of the controller actuating the final control element 115, knob 1 is turned so as to adjust flapper 14 relative to nozzle 16. This varies the air pressure in bellows casing 22 and causes exhaust pipe 24 to either exhaust air from pilot relay 26 or to move flapper 27 to admit additional air to pilot relay 26 through nozzle 28. This change in air pressure in pilot relay 26 is transmitted through pipes 29 and 30 to bellows casing 31 where it causes bellows 32 to reposition flapper 14 to a value corresponding to the pressure thus manually established by turning handle 1. The output pressure through pipe 29 is also transmitted to receiver 51 where it actuates bellows 53 and through a differential 50 actuates the floating lever 83 and the pivoted lever 74 so as to adjust flapper 72 relative to nozzle 71. A variation in the flow of air throughout nozzle 71 varies the pressure within bellows casing 119 and thus causes the bellows 120 to move the exhaust pipe 123 to either exhaust air from the pilot relay 68 or to move flapper 122 to admit air to the pilot relay 68 through the inlet nozzle 121. This changed air pressure in the pilot relay 68 is transmitted through outlet pipe 70 to the diaphragm or other air-operated motor which drives the final control element 115. The air pressure which is applied through pipe 70 to the final control element 115 is also fed back through pipe 70 to the throttling and resetting mechanism where it moves the pin 89 and thereby affects a throttling or resetting movement of flapper 72 as has already been described.

It will thus be seen that this transmission system affords means whereby a final control element 115 may be operated either manually by means of knob 1 from a control location which may be at any convenient point or may be operated from the measuring instrument 48 which is located close to the final control element 115 so that the controller is close to the final control element and actuates it without appreciable delay or lag.

FIG. 7

Fig. 7 shows a transmission system very similar in its construction and operation to that shown in Fig. 6. The principal difference is that in place of the indicator 2 of Fig. 6, there is a recorder, generally indicated at 116A. This recorder includes a receiver having a casing 116 enclosing a bellows 117. Bellows 117 moves a pen arm 118, bearing on it a pen 119, over a suitable chart 120. The indicator 2 instead of indicating the movements of the measuring instrument 48, is connected by pipe 67A to the motor for the final control element 115. The manually operable transmitter and the controller, whose set point is controlled by this transmitter and which is responsive to the measuring element 48, have the same elements to which the same reference characters have been applied as in Fig. 6, and operates in the same way.

FIG. 8

Figure 8:
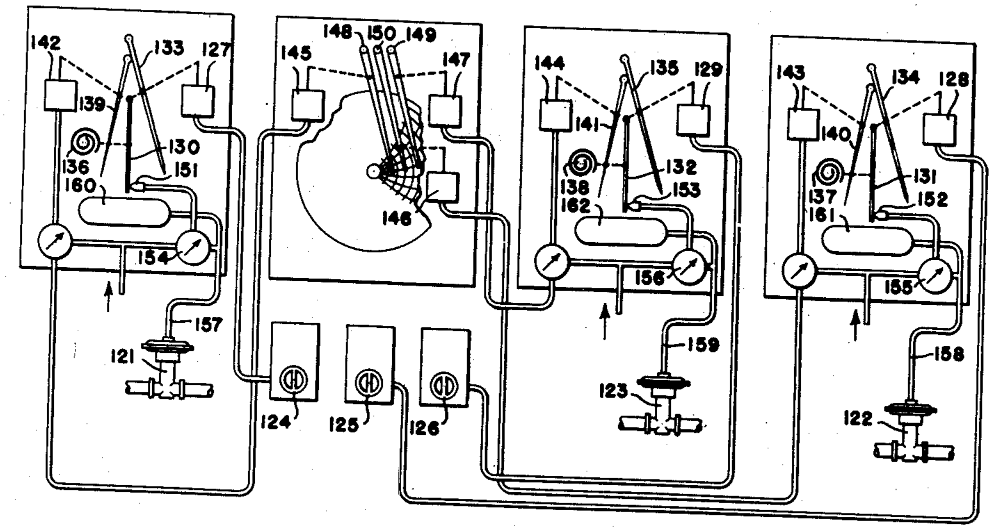

Fig. 8 shows a further modification in which a plurality of final control elements 121, 122 and 123 can be actuated by manual control handles, each mounted on a small panel and located at the control board or other central location from which the controller of an entire industrial processing plant is exercised. There is also provided at this control station, a multi-pen recorder which records the movements of each of the final control elements. The manually operable handles 124, 125, and 126 are the operating mechanisms of pneumatic transmitters which operate pneumatic receivers 127, 128, and 129, respectively. These receivers 127, 128, and 129, feed into differentials 130, 131, and 132, respectively, as well as operating set point indicators 133, 134, and 135, respectively. Adjacent the final control elements 121, 122, and 123 are controllers having measuring elements 136, 137, and 138, respectively. These measuring elements also feed into the differentials 130, 131, and 132, and likewise operate indicators 139, 140, and 141 and also operate pneumatic transmitters 142, 143, and 144, respectively. These pneumatic transmitters 142, 143, and 144 are connected to pneumatic receivers 145, 146, and 147, respectively. These receivers actuate pen arms 148, 149, and 150, respectively. The differentials 130, 131, and 132 control flappers cooperating with nozzles 151, 152, and 153, respectively. These nozzles form parts of pilot valves 154, 155, and 156 which have, respectively, off-take pipes 157, 158, and 159 leading to the motor for the final control elements 121, 122, and 123, respectively. The off-take pipes 157, 158, and 159 also lead to throttling and reset mechanisms 160, 161, and 162, respectively, whose action has been explained in the description of Fig. 5.

The modification of Fig. 8 thus shows how a number of final control elements can be actuated from a single control station under the control of a single operator and the variations sensed by measuring elements adjacent these final control elements can be recorded on a single multi-chart at the control location.

FIG. 9

Figure 9:
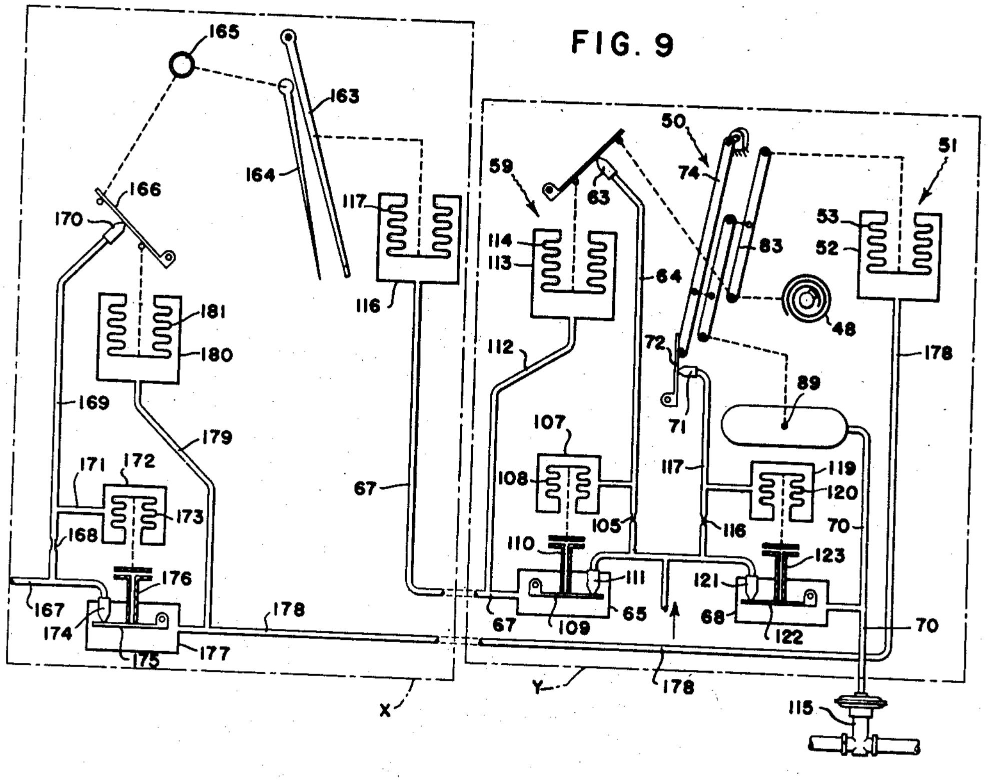

Fig. 9 shows a pneumatic transmission system which provides means for setting the index of a controller located at a remote point and for also providing a record of the control point of that instrument at the control station. At the control station, there is located within the lines X an instrument having the outward appearance of a controller equipped with a pen 163, an index 164 and a setting knob 165 for the index. The manually operable setting knob 165 feeds into a differential which controls the flapper 166 of a pneumatic transmitter. This pneumatic transmitter includes an air supply pipe 167 which feeds air through a restriction 168 and a pipe 169 to a nozzle 170 cooperating with the flapper 166. The pipe 169 has a branch 171 leading to a bellows housing 172 containing a bellows 173. Inlet pipe 167 terminates in an inlet nozzle 174 cooperating with a flapper 175 which also cooperates with an exhaust pipe 176 movable in response to the movements of the bellows 173. Flapper 175 is located in a pilot valve casing 177 having an off-take pipe 178 from which branches a pipe 179 leading to bellows casing 180 in which are housed bellows 181 which feed into a differential so as to operate or reposition the flapper 166. The outlet pipe 178 leads to an air-operated receiver 51 forming part of a controller located within the dotted and dashed lines Y and corresponding to the controllers shown in Figs. 6 and 7. When the operator turns the manually operable handle 165, he does not directly change the set point of the instrument at the control station but instead sets in motion pneumatic transmission apparatus which sends a pressure to the remotely installed controller within the lines Y where the index is positioned automatically. In order to provide rapid and accurate setting of the index on the controller, use is made of pneumatic transmitter units. This eliminates the "inching" operation which is necessary when a pressure regulator is employed for this purpose. Furthermore, the use of such a transmission system results in maintaining position of the index without deviation or drift. Moreover, the consumption of air is reduced to an absolute minimum.

FIG. 10

This modification is a controller by means of which a final control element is controlled either manually or automatically and in which there is provided means for adjusting from a control location the set point of a primary controller or of a secondary controller, which are the means for automatically controlling the final control element.

Figure 10:
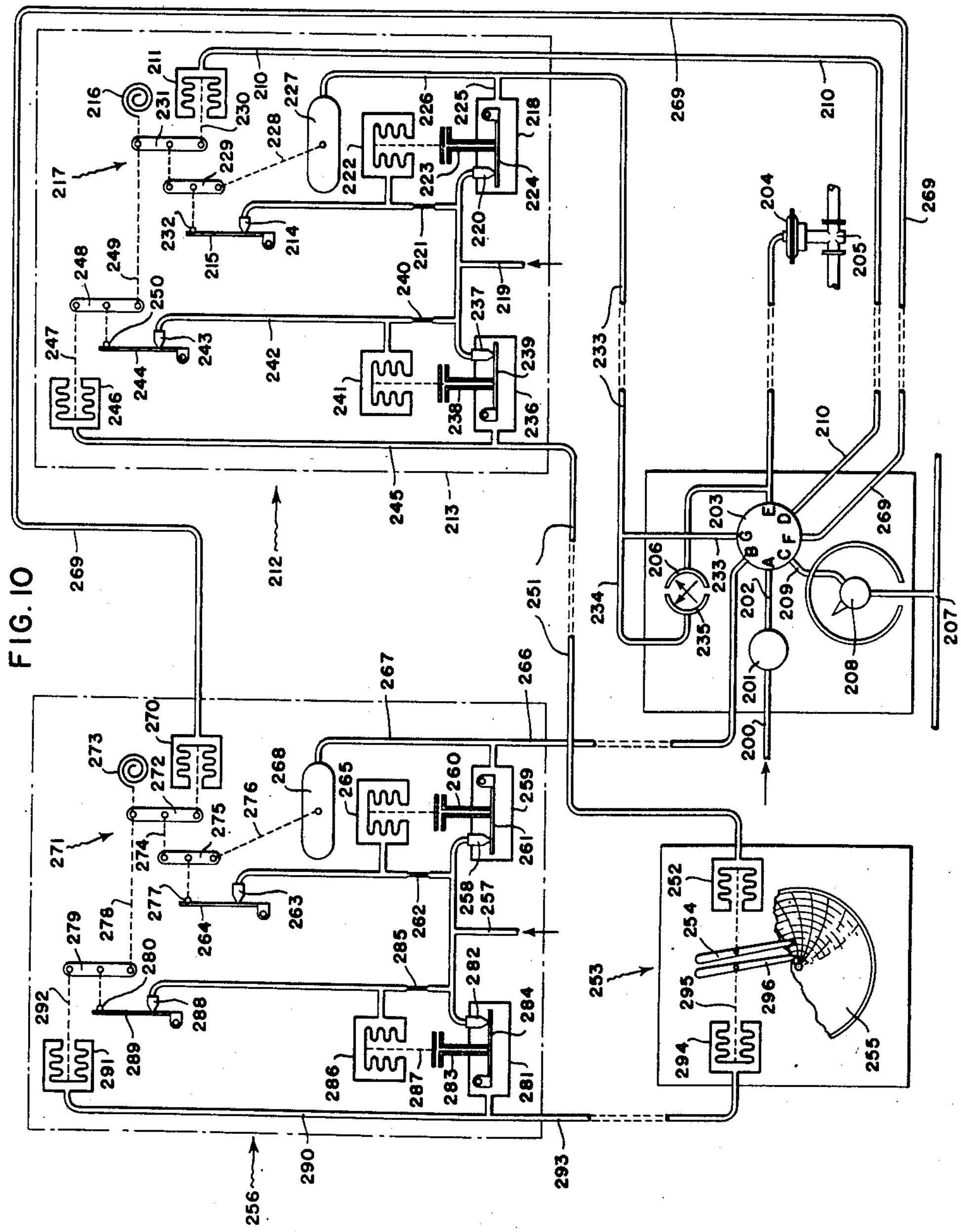
Fig. 10 is a diagrammatic or schematic showing of an additional modification.
Figure 11:
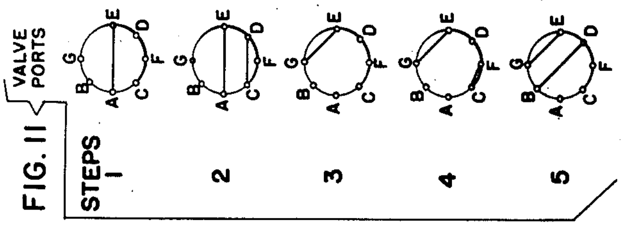
Fig. 11 is a diagrammatic tabulation showing the arrangement of the ports of one valve, of Fig. 10.

Filtered air supply 200 is controlled by a first manually operable air-pressure regulator 201 which is mounted on a panel similar to the panel shown in Fig. 1. This panel is at a control location which may conveniently be the control room or other place from which an entire industrial process plant is controlled. The various final control elements are located at various locations throughout the plant remote from the control location. From the pressure regulator 201 a pipe 202 leads to a switching valve 203. The switching valve 203 is manually operable and may be of various structural forms. The form illustrated diagrammatically in Figs. 10 and 11 is a cylindrical casing having seven ports through it which are indicated in the drawings by the reference characters A, B, C, D, E, F, and G. The movable element of the valve is a plug having channels through it which connect the various ports A–G to one another in sequence of five steps shown in Fig. 11.

The pipe 202 connects with the port A. The port E connects with the air-operated motor 204 for the final control element 205 which is located at some point in the plant or process controlling apparatus remote from the control location. Port E is also directly connected to an air-pressure-operated indicator 206 located at the control panel so as to indicate the pressure applied to motor 204. The same source of filtered air supply 200 or a second source of air supply 207 communicates with a second manually operable air-pressure regulator 208 from which an outlet pipe 209 leads to the valve port C. Valve port D is connected by means of pipe 210 with a pair of relatively movable parts constituting an air-operated receiver 211. Receiver 211 forms part of a secondary controller, generally indicated at 212, which is of the type disclosed in detail in Fig. 5. The parts of controller 212 are located within a controller casing 213. A nozzle 214 is controlled by a flapper valve 215. A measuring element 216 forms one input to a differential linkage 217 including a movable pivot. A pilot valve has a motor 222 operated in response to the flow of air through nozzle 214. Filtered air supply 219 leads to nozzle 220 and to restriction 221 in the pipe leading to nozzle 214. Motor 222 operates exhaust pipe 223 by means of a mechanical linkage. Pilot valve 218 has a flapper 224 controlling nozzle 220 and exhaust valve 223. The outlet pipe 225 from pilot relay 218 branches. Pipe 226 leads to a reset device 227 which has a mechanical linkage 228 to arm 229 of differential 217. Receiver 211 has a mechanical linkage 230 with arm 231 of differential 217. The opposite end of arm 231 is connected to measuring instrument 216. The output of differential 217 is the flapper pin 232 which actuates flapper 215.

The other branch of pipe 225 is pipe 233 which connects at its opposite end with port G of switching valve 203. Pipe 234 parallels this end portion of pipe 233 and connects at its end to indicator 235.

Filtered air supply 219 also supplies air to an air-operated transmitter made up of a pilot valve 236 having an inlet nozzle 237 and an exhaust valve 238 controlled by a flapper 239. Filtered air supply 219 is also connected to restriction 240 from which one pipe leads through an air-operated motor 241 and a branch pipe 242 leads to a nozzle 243 controlled by a flapper 244. The output air from relay 236 branches. One portion passes through a pipe 245 to an air-operated motor 246 which constitutes a repositioning device having a mechanical connection 247 to one end of a differential arm 248 the opposite end of which is connected by means of a mechanical linkage 249 to measuring instrument 216 through differential 217, if desired. The output of differential 248 is the flapper actuating pin 250.

The other portion of the output air from relay 236 passes through pipe 251 to an air-operated receiver 252 forming part of a recorder generally indicated at 253. A pivotally mounted pointer or pen arm 254 is pivoted within a recorder casing so as to pass over a chart 255 and record a marking on the chart.

A second controller similar to that shown in Fig. 6 and to that generally indicated at 212 is generally indicated at 256. This controller has the filtered air supply 257 which branches. One portion of this air is supplied to a nozzle 258 of a pilot valve or relay 259 having an exhaust valve 260 which, together with a nozzle 258, is controlled by a flapper 261. Another portion of the air from inlet 257 passes through restriction 262 to nozzle 263 controlled by flapper 264 and to motor 265 which operates relay valve 259 by means of the exhaust port 260. One portion of the outlet air from relay 259 passes through pipe 266 to port B of switch valve 203 while the other portion of the outlet air from pilot valve 259 passes through pipe 267 to reset device 268.

From port F of switch valve 203, pipe 269 passes through an air-operated receiver 270 which is connected to one end of a lever 272 which forms part of a differential generally indicated at 271. A measuring instrument 273 is connected to the opposite end of lever 272.

The output 274 of lever 272 connects to one end of a second differential lever 275 whose opposite end is driven by a mechanical connection 276 from reset device 268. The output of differential 271 is formed by flapper pin 277. A mechanical connection 278 leads from measuring instrument 273, to differential 271, if desired, to one end of a differential lever 279 whose output is formed by flapper pin 280. Pilot valve 281 has a nozzle 282, connected to filtered air supply 257, an exhaust valve 283, and a flapper 284.

Air from supply 257 also passes through restriction 285 to an air-operated motor 286 having a mechanical connection 287 with exhaust valve 283 and to nozzle 288 controlled by flapper 289.

The outlet air from pilot relay 281 branches. One portion passes up through pipe 290 to an air-operated motor 291, constituting a repositioning device, having a mechanical connection 292 to the opposite end of differential lever 279. The other portion of the outlet air from pilot relay 281 passes through pipe 293 to an air-operated motor 294 having a mechanical connection 295 with a second indicator or pen arm 296 pivotally mounted within the recorder and movable in response to movements of motor 294 so as to mark records on chart 255.

FIG. 11

This figure is a diagrammatic or schematic showing of the connections between the various ports of the switching valve 203 in each of the various, successive steps by which this controller performs various operations. When it is desired to start up the process under the control of the final control element 205, the switching valve is operated into the position in which it is shown in Fig. 11, step 1, in which the valve ports A and E are connected. Air thus passes from the inlet 200 through the first manually-operable air-pressure regulator 201, pipe 202, the switching valve ports A and E to the motor 204, which operates the final control element 205, and also to the first air-pressure-operated indicator 206, which indicates the instantaneous value of the air pressure applied to the motor 204 and consequently the position of the final control element 205. The next step 2 is to adjust the set point of the secondary controller 212 so that it can assume control of the final control element 205 and maintain the final control element at the position to which it has been set by the manually operable pressure regulator 201. In order to do this, the switching valve 203 is turned into the position in which it is shown in Fig. 11, step 2. In this position, ports A and E of switching valve 203 remain connected so that the manually operable pressure regulator 201 can adjust the valve-operating motor 204. At the same time, ports C and D of switching valve 203 are connected. Air enters from supply 207 and passes through second manually operable air-pressure regulator 208, pipe 209, valve ports C and D, pipe 210, to receiver 211. Second regulator 208 can be manually adjusted so that movement of receiver 211 moves linkage 230, and differential 217 so as to adjust the position of flapper 215 relative to nozzle 214 and thereby control the flow of air through second pilot or relay valve 218. The control flow of outlet air from second pilot or relay 218 passes through pipe 233 to second air-pressure-operated indicator 235 which is located at the control location adjacent the first indicator 206. This permits the air pressure applied to the motor 204 to be compared readily with the air presusre applied to the controller 212. When these two pressures are equal or approximately equal, step 3 can be taken. This step consists in taking the control of the final control element 205 away from the first manually operable air-pressure regulator 201 and connecting the motor 204 under the automatic control of the secondary controller 212. Fig. 11, step 3, shows that this is done by shutting off the connection between ports A and E and making a connection between ports G and E of switching valve 203. The motor 204 is thus connected under the control of the measuring instrument 216 of the secondary controller 212. If it is desired to adjust the set point of the secondary controller 212 automatically instead of manually, by means of the second manually operable air-pressure regulator 208, the switching valve 203 is next turned into the position in which it is shown in Fig. 11, step 4. In this position the connection between port G and E remains made, however, and connection is made between ports C and F. Air flows from the supply 207 through the second manually operable air-pressure regulator 208, the valve ports C and F, pipe 269, to the third air-operated receiver 270. Manual movement of regulator 208 causes consequent movement of second receiver 270 which moves differential lever 272, mechanical linkage 274, and differential lever 275 to move flapper pin 277 so as to adjust the flapper 264 relative to the nozzle 263. The flow of air through nozzle 263, as controlled by flapper 264, controls the motor 265 of the third pilot or relay valve 259. When the set point of the primary controller 256 is thus adjusted to a suitable position, the secondary controller 212 can be connected so that its set point is under the control of the primary controller 256. Then step 5 is taken by turning the switching valve 203 into the position in which it is shown in Fig. 11, step 5. In this position, motor 204 is connected through valve ports E and G under the control of the second pilot or relay valve 218. At the same time, the primary controller 256 is connected so that the third pilot or relay valve 259 is connected through pipe 266, valve ports B and D, and pipe 210 to the first air-operated receiver 211. These connections allow the primary controller 256 to adjust the set point of the secondary controller 212 which in turn controls the position of the final control element 204.

FIG. 12

Figures 12, 13:
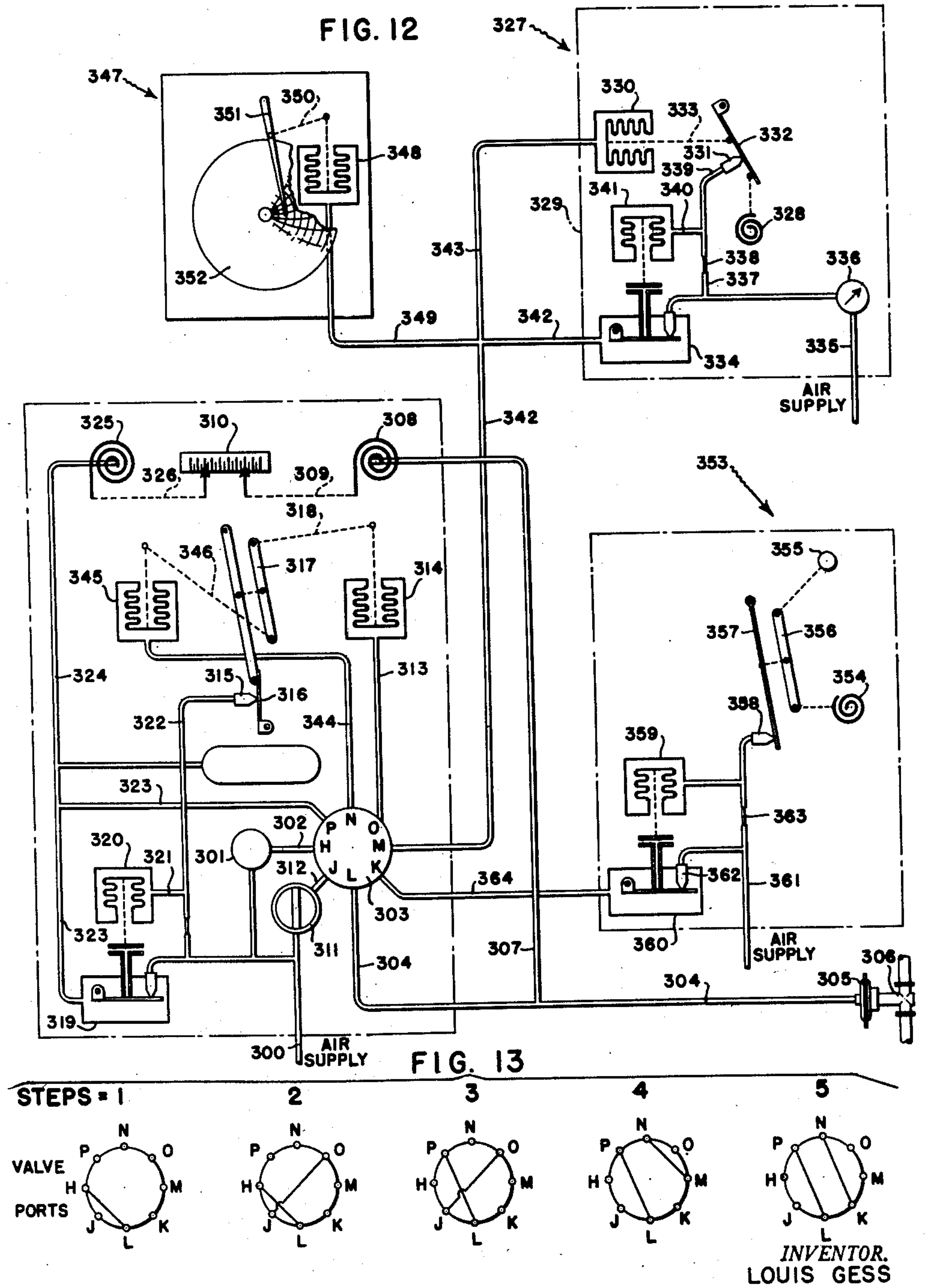
Fig. 12 is a diagrammatic or schematic showing of an additional modification.
Fig. 13 is a diagrammatic tabulation showing the arrangement of the ports of one valve, of Fig. 12.

This figure discloses an air-operated controller for manually or automatically operating from a control location a motor-driven final control element positioned at a place remote from the control location. This control location is delimited by the dot-and-dash line 399. This controller comprises a filtered air supply 300 by means of which air at a suitable pressure is supplied to a first manually operable air pressure regulator 301 at the control location. From regulator 301, a pipe 302 leads to a switching valve 303. Switching valve 303 is shown in Figs. 12 and 13 diagrammatically. This valve may have various physical embodiments but the preferred embodiment consists of a tubular or cylindrical casing having eight ports or openings through it. These ports or openings are designated by the reference characters H, J, K, L, M, N, O, P. On this casing is rotatably mounted a plug having openings through it connecting the various ports. From port L, a pipe 304 leads to motor 305, such as an air-operated diaphragm motor, for final control element 306. A branch pipe 307 leads from pipe 304 to a Bourdon tube 308 or similar pressure-responsive device which operates a first air-pressure-operated indicator consisting of a pointer 309 movable over a scale 310.

A second manually operable air pressure regulator 311 is also connected to the filtered air source 300. A pipe 312 connects the output side of the second regulator 311 to the port J of the switching valve 303. A pipe 313 connects the port O of the switching valve 303 to a pair of relatively movable parts, such as an air-tight casing and a cooperating flexible bellows, constituting a first air-operated receiver 314. A nozzle 315 is controlled by a flapper valve 316. A differential linkage 317 including a movable pivot is driven by a mechanical linkage 318 from said first receiver 314 so as to adjust the flapper valve 316. A pilot valve 319 is operated by an air-operated motor 320 through a pipe 321 communicating with a pipe 322 which terminates at the nozzle 315. An outlet pipe 323 from pilot valve 319 leads to port P of switching valve 303. A branch pipe 324 connects pipe 323 with a second air-pressure-operated indicator comprising a Bourdon or like pressure operated element 325 which moves a second indicator 326 across scale 310 out of the path of motion of pointer 309.

A controller, generally indicated by 327, is located at the remote location adjacent the final control element 306 and has a measuring element 328. Within the controller casing 329 is a second pair of relatively movable elements 330 such as an airtight casing and a cooperating flexible bellows. This second pair of relatively movable elements constitutes an air-operated reset device forming part of an air-operated transmitter. This transmitter includes a second nozzle 331 controlled by a second flapper valve 332. Flapper valve 332 is operated by measuring element 328 and is reset by elements 330 by means of a mechanical linkage 333. The transmitter also includes a second pilot valve 334 supplied with air from a source 335 of filtered air pressure which passes through gauge 336. A pipe 337 contains a restriction 338 and branches into pipe 339 which terminates in nozzle 331 and pipe 340 which communicates with an air-operated motor 341 comprised of an air-tight casing and a cooperating flexible bellows. A pipe 342 leads off from the second pilot valve 334. Air is supplied to the reset device 330 from pipe 342 through a pipe 343.

From port N of switching valve 303, a pipe 344 leads to a third pair of relatively movable elements constituting a second air-operated receiver 345. A mechanical linkage 346 connects the receiver 345 with one end of the differential 317 so that movements of the second receiver 345 are transmitted through differential 317 to the first flapper valve 316. At the control location there is provided a recorder, generally indicated at 347, and having a third pair of relatively movable elements constituting a third air-operated receiver 348 communicating with the second pilot or relay valve 334 through pipes 342 and 349. A mechanical linkage 350 drives a pen arm 351 from the third receiver 348 so that the pen arm marks a chart 352 in the recorder 347.

There is also provided a primary controller, generally indicated at 353, and having a second measuring element 354 and a manually operable index setting knob 355 connected to a differential linkage 356 which drives a third flapper valve 357 controlling the flow of air through a third nozzle 358 which controls an air-power motor 359 forming the operating mechanism for a third pilot valve 360 which constitutes a second transmitter. A source of filtered air 361 supplies air at full pressure to the nozzle 362 of the third pilot valve 360 and also supplies air through a restriction 363 at a reduced pressure to nozzle 358 and motor 359. A pipe 364 connects the output side of the third pilot valve 360 with port K of switching valve 303.

*Operation of Fig. 12*

Fig. 13 shows diagrammatically the connections between the various ports of the switching valve 303 as this valve is turned in a sequence of five steps to connect the various parts of the control system. When it is desired to start up the process under control of the final control element 306, switching valve 303 is turned into the position shown in Fig. 13, step 1. Port H is connected to port L so that air flows from source 300 through first manually operable pressure regulator 301, pipe 302, ports H and L, and pipe 304 to motor 305. Branch pipe 307 also conducts this air to Bourdon tube or spiral 308 so that the first air-pressure-operated indicator indicates by means of pointer 309 and scale 310 the pressure which is applied to motor 305 and consequently to the final control element 306. At the same time the control point of the controller 327 is observed on the recorder 347 just above the indicator 309—310. In order to prepare the controller to automatically control the final control element 306 from the measuring element 328, the set point or air pressure sent out from pilot or relay valve 319 must be adjusted so that it is substantially equal to that currently applied to motor 305. If the pressure to be applied to the motor 305 should be different from that being applied, the process controlled by the final control element 306 would be disturbed. Consequently, the second step, shown in Fig. 13, step 2, comprises turning switching valve 303 into such a position that ports H and L remain connected while ports J and O are connected by a different connection separate from that connecting ports H and L. Air flows from source 300 through the second manually operable air pressure regulator 311, pipe 312, ports J and O, pipe 313, to the first air-operated receiver 314. Any movement of the receiver 314 operates the mechanical linkage 318 and the differential 317 so as to adjust flapper 316 relative to nozzle 315. Adjustment of flapper 316 and the consequent variation of pressure at the nozzle 315 operates motor 320 and causes the output air pressure of the pilot valve or relay 319 to vary correspondingly. The output pressure from pilot valve 319 is transmitted through pipes 323 and 324 to Bourdon tube or spiral 325 and causes the second air-pressure-operated indicator to indicate the pressure put out by pilot valve 319. This indication is given by pointer 326 which moves over scale 310 out of the path of movement pointer 309. When the pressure measured by the first indicator 309 is equal to that measured by the second indicator 326 these pointers coincide and indicate equal pressures by reference to scale 310. When these two pressures are equal, the switching valve 303 can be turned into the position shown in Fig. 13, step 3. In this position there is a connection between ports J and O and there is another connection between ports P and L separate and distinct from that between ports J and O. Manual operation of the second manual regulator 311 causes positioning of final control element 306 because the second manual regulator 311 forms a pneumatic transmitter whose movements are repeated by the first pneumatic receiver 314 which, in turn, transmits these movements by linkage 318 and differential 317 to flapper 316. These corresponding movements of flapper 316 control the flow of air through nozzle 315 and consequently govern the output of air from relay 319. The output air from relay 319 is conducted by pipe 323, through ports P and L, and pipe 304 to motor 305. To place the final control element 306 under the control of measuring element 328, the switching valve 303 is turned into the position in which it is shown in Fig. 13, step 4. In the step 4 position, there is an open communication between ports M and N and a second, separate open connection between ports P and L. The movements of measuring element 328 in response to any variations of the condition measured by it, moves flapper 332 and thus varies the air flow through nozzle 331. Consequently, motor 341 operates relay 334 so that the output air from relay 334 is transmitted through pipe 342, ports M and N, and pipe 344 to the second air-operated receiver 345. The resulting movements of receiver 345 move linkage 346, differential 317, and flapper 316. Flapper 316 controls the flow of air through nozzle 315 and consequently the operations of motor 320 which cause corresponding movements of relay 319. The output air from relay 319 is conducted through pipe 323, ports P and L, pipe 304 to motor 305. During this step a record of the movements of measuring element 328 is made on recorder 347 because any variation in the pressure in pipe 342 is transmitted through pipe 349 to the third air-operated receiver 348 and causes movements of pen 351 by means of linkage 350. When it is desired to operate the final control element 306 automatically in response to the variations sensed by measuring element 354 of controller 353, switching valve 303 is turned into the position in which it is shown in Fig. 13, step 5. In the step 5 position, there is an open communication between ports K and N and a separate and distinct open connection between ports P and L. Any variations in the condition to which measuring element 354 is responsive cause corresponding movements of measuring element 354. Movement of measuring element 354 moves differential 356 and flapper 357 relative to nozzle 358. Variations in the air flow through nozzle 358 cause the air-operated motor 359 to operate pilot valve or relay 360 whose outlet air is conducted through pipe 364, ports K and N, to the second air-operated receiver 345. Any movements of the second air-operated receiver 345 cause corresponding movements of the final control element 306 by means of the circuit already described.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In an air-operated controller for a motor-operated final control element, a manually operable knob at a control location, a gear train driven by said knob, a flapper valve driven by said gear train, a nozzle whose outlet flow is controlled by said flapper valve, a pilot valve constituting an air-operated transmitter and having an operating motor controlled by the outlet flow through said nozzle, a pair of relatively movable elements constituting an air-operated repositioning device and moving in response to the output flow of said pilot valve, a mechanical connection between one of said relatively movable elements and said flapper valve for positioning said flapper valve in response to the movements of said relatively movable elements, an air-operated controller mounted at a remote location adjacent the final control element and including, a pair of relatively movable elements constituting an air-operated receiver and connected so as to be moved in response to the output flow of said pilot valve, a second nozzle, a second pilot valve having an operating motor controlled by the outlet flow through said second nozzle, a second flapper valve controlling the flow of air through said second nozzle, a measuring element controlling the position of said second flapper valve, a differential linkage forming the driving connection between said measuring element and said second flapper valve and having a floating pivot forming a part of said linkage, a connection between said receiver and said linkage for adjusting the set point of the controller, a connection between said second pilot valve and the motor for the final control element, a third pair of relatively movable elements constituting a second air-operated repositioning device, a third nozzle, a third flapper valve controlling the flow through said third nozzle, a mechanical connection between said measuring element and said flapper, a third pilot valve constituting a second air-operated transmitter and having a motor responsive to the outlet flow through said third nozzle, a connection between the outlet side of said third pilot valve and said third pair of relatively movable elements whereby said second repositioning device is moved in response to the output flow of said third pilot valve, a linkage between said third pair of movable elements and said third flapper valve so that said third flapper valve is positioned in response to movements of said second repositioning device, an indicator located adjacent said knob, and a connection between the outlet side of said third pilot valve and said indicator whereby said indicator shows at the control location the value sensed by said measuring element at that instant at the remote location.

2. In an air-operated controller for a motor-operated final control element, a manually operable knob at a control location, a gear train driven by said knob, a flapper valve driven by said gear train, a nozzle whose outlet flow is controlled by said flapper valve, a pilot valve constituting an air-operated transmitter and having an operating motor controlled by the outlet flow through said nozzle, a pair of relatively movable elements constituting an air-operated repositioning device and moving in response to the output flow of said pilot valve, a mechanical connection between one of said relatively movable elements and said flapper valve for positioning said flapper valve in response to the movements of said relatively movable elements, an air-operated controller mounted at a remote location adjacent the final control element and including, a pair of relatively movable elements constituting an air-operated receiver and connected so as to be moved in response to the output flow of said pilot valve, a second nozzle, a second pilot valve having an operating motor controlled by the outlet flow through said second nozzle, a second flapper valve controlling the flow of air through said second nozzle, a measuring element controlling the position of said second flapper valve, a differential linkage forming the driving connection between said measuring element and said second flapper valve and having a floating pivot forming a part of said linkage, a connection between said receiver and said linkage for adjusting the set point of the controller, a connection between said second pilot valve and the motor for the final control element, a third pair of relatively movable elements constituting a second air-operated repositioning device, a third nozzle, a third flapper valve controlling the flow through said third nozzle, a mechanical connection between said measuring element and said third flapper, a third pilot valve constituting a second air-operated transmitter and having a motor responsive to the outlet flow through said third nozzle, a connection between the outlet side of said third pilot valve and said third pair of relatively movable elements whereby said second repositioning device is moved in response to the output flow of said third pilot valve, a linkage between said third pair of movable elements and said third flapper valve so that said third flapper valve is positioned in response to movements of said second repositioning device, a fourth pair of relatively movable elements constituting a receiver at the control location, a connection between said fourth pair of relatively movable elements and the outlet side of said third pilot valve, a pen arm movably positioned by said fourth pair of relatively movable elements, and a chart located to receive records from said pen arm and located at the control location adjacent said knob.

3. In an air-operated controller for a motor-operated final control element, a manually operable knob at a control location, a gear train driven by said knob, a flapper valve driven by said gear train, a nozzle whose outlet flow is controlled by said flapper valve, a pilot valve constituting an air-operated transmitter and having an operating motor controlled by the outlet flow through said nozzle, a pair of relatively movable elements constituting an air-operated repositioning device and moving in response to the output flow of said pilot valve, a mechanical connection between one of said relatively movable elements and said flapper valve for positioning said flapper valve in response to the movements of said relatively movable elements, an air-operated controller mounted at a remote location adjacent the final control element and including, a pair of relatively movable elements constituting an air-operated receiver and connected so as to be moved in response to the output flow of said pilot valve, a second nozzle, a second pilot valve having an operating motor controlled by the outlet flow through said second nozzle, a second flapper valve controlling the flow of air through said second nozzle, a measuring element controlling the position of said second flapper valve, a differential linkage forming the driving connection between said measuring element and said second flapper valve and having a floating pivot forming a part of said linkage, a connection between said receiver and said linkage for adjusting the set point of the controller, a connection between said second pilot valve and the motor for the final control element, a third pair of relatively movable elements constituting a second air-operated repositioning device, a third nozzle, a third flapper valve controlling the flow through said third nozzle, a mechanical connection between said measuring element and said third flapper, a third pilot valve constituting a second air-operated transmitter and having a motor responsive to the outlet flow through said third nozzle, a connection between the outlet side of said third pilot valve and said third pair of relatively movable elements whereby said second repositioning device is moved in response to the output flow of said third pilot valve, a linkage between said third pair of movable elements and said third flapper valve so that said third flapper valve is positioned in response to movements of said second reset device, an indicator located at the control location adjacent said knob, and a connection between the output side of said second pilot valve and said indicator whereby said indicator shows the air pressure applied to the motor of the final control element.

4. In an air-operated controller for manually or automatically operating from a control location a motor-driven final control element positioned at a place remote from the control location, a first manually operable air pressure regulator at the control location, a switching valve having a connection for connecting said first manual regulator to the motor of the final control element, an air-pressure-operated indicator connected to the motor of the final control element, a second manually operable air pressure regulator, a pair of relatively movable parts constituting an air-operated receiver, said switching valve having connections for connecting said second regulator to said receiver, a nozzle, a flapper valve controlling the flow of air through said nozzle, a differential linkage including a movable pivot and connecting said receiver to said flapper so that said movable pivot is positioned by said receiver so as to locate the set point of said flapper, a pilot valve having a motor operated in response to the flow through said nozzle, said switching valve having connections connecting the output side of said pilot valve and the motor of final control element, a second air-pressure-operated indicator connected to the output side of said pilot valve and to said last mentioned connections, a measuring element located at the remote location adjacent the final control element, a second pair of relatively movable elements constituting an air-operated repositioning device, a second nozzle, a second flapper valve controlling the flow of air through said second nozzle, a second pilot valve constituting an air-operated transmitter and having a motor operated in response to the flow of air through said second nozzle, a connection between the output side of said second pilot valve and said repositioning device, a linkage between said repositioning device and said second flapper valve, a third pair of relatively movable elements constituting a second air-operated receiver, a mechanical connection between said second receiver and the differential linkage whereby said measuring element moves said first mentioned flapper valve, a third pair of relatively movable elements constituting a third air-operated receiver, air conduits forming connections connecting said second pilot valve to said third receiver, a pen arm operated by said second receiver, a chart located at the control location adjacent said manually operated air-pressure regulators so as to receive a record from said pen arm, a second measuring element, a third nozzle, a third pilot valve constituting a second transmitter and having a motor operable in response to the flow through said third nozzle, a third flapper valve controlling the flow through said third nozzle, a differential linkage including a movable pivot and connecting said second measuring element to a connection between said second transmitter and said second receiver whereby said second measuring element moves said first mentioned flapper valve and exercises control over the final control element.

5. In an air-operated control system for manually adjusting from a control station the set point of a controller, the combination including, a measuring element movable in response to a variable under control, a controller located remote from said control station and adjacent the final control element of the system and operative in response to deviations from a given set point by the variable actuating said measuring element, said controller supplying operating compressed air to the motor of the final control element of the system to correct for said deviations, a control station, an air-operated transmitter at said control station, a manually operable knob at said control station, gearing interposed between said knob and said transmitter whereby said knob operates said transmitter, a receiver connected to said transmitter and operated thereby, adjustable set point means in said controller and connected to said receiver and operated thereby, whereby the value of the variable to be maintained by said controller can be selected at will, an air-operated transmission system including a transmitter movable in response to movements of the measuring element of said controller and a second receiver, and air-operated indicating means at said control station and actuated by said second receiver to show the varying value of the variable measured by said measuring element, in response to air pressures proportional to the values of the variable measured by said measuring element.

6. In an air-operated control system, the combination including, a manually operated transmitter having a manually operable knob, gearing manually operated by said knob, a movable flapper operated by said gearing, a nozzle supplied with compressed air, a pilot valve operated by the varying air pressure in said nozzle, an output pipe connected to said pilot valve, a receiver connected to said output pipe, a controller located remote from said control station and adjacent the final control element of the system, said receiver being located in said controller so as to vary the set point of said controller, a measuring element located in said controller and movable in response to a variable under control, said controller actuating the motor of the final control element of the system, an air-operated transmission system including a second transmitter movable in response to the movements of the measuring element of said controller and including a second receiver, and an indicator located adjacent said knob and connected to said second receiver, whereby said indicator shows at the control station the value sensed by said measuring element at that instant at the remote location.

References Cited in the file of this patent

UNITED STATES PATENTS

| | | |
|---|---|---|
| 2,205,930 | Otto | June 25, 1940 |
| 2,470,452 | Ackley | May 17, 1949 |
| 2,529,875 | Howard | Nov. 14, 1950 |